United States Patent [19]
Ferri et al.

[11] 3,974,389
[45] Aug. 10, 1976

[54] TERBIUM-ACTIVATED RARE EARTH OXYSULFIDE X-RAY PHOSPHORS

[75] Inventors: John L. Ferri, Towanda; James E. Mathers; Ramon L. Yale, both of Ulster, all of Pa.

[73] Assignee: GTE Sylvania Incorporated, Stamford, Conn.

[22] Filed: Nov. 20, 1974

[21] Appl. No.: 525,590

[52] U.S. Cl............................ 250/483; 252/301.4 S
[51] Int. Cl.² .................... C09K 11/08; G01T 1/00
[58] Field of Search ......... 250/483, 213 R, 213 VT, 250/483; 252/301.4 S

[56] References Cited
UNITED STATES PATENTS 3,617,743  11/1971  Rabatin ............................. 250/483
3,639,254  2/1972  Peters ........................... 252/301.4 S
3,829,700  8/1974  Buchanan ......................... 250/483

Primary Examiner—Archie R. Borchelt
Attorney, Agent, or Firm—Norman J. O'Malley; Donald R. Castle; William H. McNeill

[57] ABSTRACT

Terbium-activated rare-earth oxysulfide X-ray phosphors containing small amounts of cerium exhibit shorter decay times than the same materials without cerium. X-ray intensifying screens employing such phosphors enable improved resolution.

8 Claims, 1 Drawing Figure

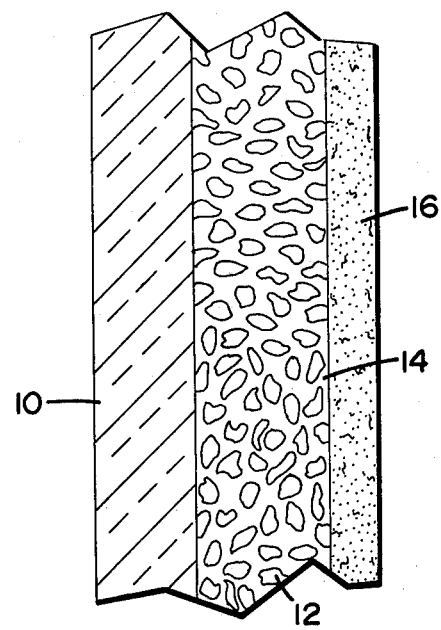

TERBIUM-ACTIVATED RARE EARTH OXYSULFIDE X-RAY PHOSPHORS

BACKGROUND OF THE INVENTION

1. Field of the Invention

This invention relates to phosphors used in x-ray intensifying screens. More particularly it relates to terbium-activated rare-earth oxysulfide phosphors.

2. Prior Art

Calcium tungstate is the major x-ray phosphor. Terbium-activated rare-earth oxysulfide phosphors are known as being more efficient x-ray phosphors than the presently used x-ray phosphors. U.S. Pat. No. 3,725,704 states that the efficiency of certain terbium-activated rare-earth oxysulfide phosphors is from about 4 to 6 times greater than calcium tungstate.

While these phosphors have good efficiency decay times are a problem. As can be appreciated an ideal material would cease to emit light instantaneous upon the cessation of the excitation media. In the x-ray usage a sort decay time is essential because excessive decay time results in poor quality exposures upon the x-ray film.

U.S. Pat. No. 3,705,858 mentions that conventionally produced terbium-activated rare-earth oxysulfide x-ray phosphors have an excess decay time. While phosphors prepared by the techniques disclosed in U.S. Pat. No. 3,705,858 are stated to have shorter decay time than the corresponding phosphors produced by conventional methods, the process disclosed is not efficient since it requires precise control and involves forming a sulfite precursor via a precipitation step, a heating step under controlled conditions followed by an ignition step. With the multitude of steps involved the procedure is both time consuming and costly.

It is believed therefore a terbium-activated rare-earth oxysulfide phosphor, prepared in a conventional manner, containing an additive which appreciably shortens the decay is an advancement in the art. It is further believed that x-ray screens utilizing such phosphor and thus enable exposed films that have improved resolution is an advancement in the art.

OBJECTS AND SUMMARY OF THE INVENTION

It is an object of this invention to provide an improved x-ray phosphor.

It is another object of this invention to provide an improved x-ray intensifying screen.

It is a further object of this invention to provide a terbium-activated rare-earth oxysulfide phosphor having a short decay time.

It is still another object of this invention to provide an effective means of shortening the decay on terbium-activated rare-earth oxysulfide phosphors wherein the rare-earths are selected from the group consisting of lanthanum, gadolinium, and yttrium.

These and other objects are achieved in one aspect of this invention wherein an x-ray phosphor is provided that consists essentially of a host selected from the group consisting of lanthanum oxysulfide, gadolinium oxysulfide, and yttrium oxysulfide, as an activator from about 0.0005 to about 0.1 mole of terbium per mole of host and as a decay accelerator from an effective amount to about 25 ppm of cerium.

In another aspect of this invention there is provided an x-ray conversion screen consisting essentially of a terbium-activated rare-earth oxysulfide phosphor containing cerium as described herein, a binder for the phosphor and a substrate for the phosphor and the binder.

BRIEF DESCRIPTION OF THE DRAWINGS

The FIGURE is a cross-sectional view of an x-ray conversion screen of the invention.

DESCRIPTION OF THE PREFERRED EMBODIMENTS

For a better understanding of the present invention, together with other and further objects, advantages and capabilities thereof, reference is made to the following disclosure and appended claims in connection with the above-described drawings.

X-ray phosphors are adhered to a supporting substrate and are used to emit visible light when excited by x-ray photons. X-ray conversion screens are used in numerous ways. For example, fluoroscopic screens, intensifying screens for direct contact with films and in x-ray image intensifier tubes which use the emitted light to sensitize a photo-cathode. In each instance, in addition to being an efficient producer of light, it is desirable that the "afterglow" of decay of the phosphor on the screen can be minimized. Efficiency of a phosphor is a combination of the effectiveness of a material to stop x-rays and to "convert" the energy into visible light. The terbium-activated rare-earth oxysulfide phosphor wherein the rare-earth is selected from the group consisting of lanthanum, gadolinium, and yttrium have a relatively high efficiency as compared to other x-ray phosphors, such as calcium tungstate, zinc-cadmium sulfide and cesium iodide. The terbium-activator content can range from about 0.0005 to about 0.1 moles per mole of host with from about 0.001 to about 0.006 moles per mole of host being preferred.

The drawing is a cross-section view of an improved screen of this invention which comprises a x-ray transparent, light translucent substrate 10 upon which the phosphors 12 of this invention are adhered to the substrate 10 by an organic binder 14. The binder 14 should not interfere with the light emitted by the phosphors 12 or with the x-ray bombardment. The substrate 10 can be of various materials such as plastic, glass, metal, and the like. The purpose of the substrate 10 is to provide an adequate support for the phosphor 12 which are imbedded in the binder 14. A protective film 16 is also sometimes placed over the phosphors and binder on the side opposing the substrate to protect the binder 14 and the phosphors 12. The film 16 which should not interfere with either the light or the x-rays.

Any additive which is used to improve either efficiency or decay characteristics should not appreciable effect the other characteristics. Cerium had been found to appreciably shorten the decay in certain rare-earth oxysulfide phosphors and when used in proper amounts does not appreciably affect the efficiency characteristics of the phosphor.

The x-ray film presently in use is a blue sensitive film, although efforts are being exerted to find a film which is particularly adapted to green emission. At such time as the green sensitive film is developed substantial additional benefit will be realized from this invention. It has been found that cerium alters the color of emission by causing a shift from blue to green. If a more blue emission is desired to more closely match the emission without cerium, the terbium level of the activator can be lowered.

The most efficient method of controlling the level of cerium has been found to make a blend of cerium oxide and the appropriate rare-earth oxide, lanthanum oxide, gadolinium oxide, or yttrium oxide which contains a known amount of cerium such as 100 parts of cerium metal per 1 million parts of rare-earth oxide. The foregoing blend is then used in an admixture of the corresponding oxide without cerium, the appropriate amount of flux, activator, and sulfur which is heated under controlled conditions to convert the oxides to oxysulfides. The amount of the above-described blend is chosen to yield a rare-earth oxysulfide having from an effective amount to control the decay to 25 parts per million of cerium. The effective amount will vary. The amount will depend to a large extent upon trace impurities that are present in the oxide raw materials. In some instances as little as 1 part per million is effective as a decay accelerator. The quantity which is preferrable can be determined by measuring the persistance against a known standard as hereinafter described. Amounts of cerium above about 10 ppm can in some instances lower the brightness of the phosphor. In some usages such as direct replacement for the presently used calcium tungstate phosphors the lower brightness can be tolerated. However, in other instances where the present invention, due to improved brightness, enables new usages of x-rays, the lower brightness may not be acceptable, therefore amounts of less than 10 ppm are recommended when high brightness is extremely important.

To more fully explain the subject invention the following illustrative examples are presented. All parts, proportions, and percentages are by weight unless otherwise indicated.

EXAMPLE 1

The following materials are blended to form a relative uniform admixture:

32.419 parts $La_2O_3$
0.187 parts $Tb_4O_7$
11.200 parts S
12.720 parts $Na_2CO_3$
2.84 parts $Na_2HPO_4$ After the above compounds are blended the admixture is placed in a covered crucible, and heat treated for 2 hours at 1200°C. After removing soluble components by water washing, the resultant phosphor exhibits a green emission when excited by x-rays. Decay values are listed in Table 1 as 0 ppm Ce.

EXAMPLE 2

Upon repeating Example 1 with the addition of various amounts of Ce (as $CeO_2$), a phosphor with a decay shorter than Example 1 results. Values are listed in Table 1.

EXAMPLE 3

Example 1 is repeated except instead of $La_2O_3$, $Gd_2O_3$ is used, and various levels of Ce (as $CeO_2$) are added, the decay decreases with increasing amounts of Ce, as shown in Table 2.

Table 1

| $La_2O_2S:Tb$ | ppm Ce | x-ray decay[1] |
|---|---|---|
| | 0 | $2.8 \times 10^{-3}\%$ (30 sec.) |
| | 1 | $1.3 \times 10^{-3}\%$ |
| | 3 | $5 \times 10^{-4}\%$ |
| | 5 | $3.7 \times 10^{-4}\%$ |

Table 1-continued

| $La_2O_2S:Tb$ | ppm Ce | x-ray decay[1] |
|---|---|---|
| | 7 | $2.5 \times 10^{-4}\%$ |

Table 2

| $Gd_2O_2S:Tb$ | ppm Ce | x-ray decay[1] |
|---|---|---|
| | 0 | $4.0 \times 10^{-3}\%$ (30 sec.) |
| | 1 | $2.1 \times 10^{-3}\%$ |
| | 3 | $1.3 \times 10^{-3}\%$ |
| | 5 | $3.0 \times 10^{-4}\%$ |

[1]Expressed as % of control sample at full excitation.

Substantially similar results are achieved for decay acceleration when a terbium-activated yttrium oxysulfide is prepared.

The following method is used for measuring decay given in Tables 1, 2, and 3:

PERSISTENCE MEASUREMENT OF X-RAY EXCITED RARE EARTH OXYSULFIDES

One method used to measure decay in the foregoing x-ray phosphor is a technique using a General Electric portable industrial x-ray unit as the excitation source and a Gamma Model 2900 Auto-Photometer coupled to a Beckman 10-inch recorder as the measuring device.

The General Electric Portable Industrial X-Ray Unit used is a Model LX-140. It operates at a fixed x-ray tube current of 2 ma and variable accelerating voltage from 70 to 140 kilovolts. The unit is housed in a 24 × 24 × 48 inches high lead-lined cabinet with safety interlock switches connected to the external control unit.

The Gamma Scientific Model 2900 Auto-Photometer is coupled to a S-11, end-on photomultiplier tube. An auxiliary output signal is fed to a Beckman 10-inch recorder which has full scale deflection of less than 0.5 second. The recorder has seven speeds — 0.1, 0.2, 0.5, 1, 2, 5, and 10 inches per minute.

The phosphor is placed in a 1.3-cm hole in a 2.3-mm thick brass holder which is covered on one side by a plastic tape. The phosphor is spatulated smooth with the surface of the holder. The holder is placed on a stage located approximately 18-cm below the center line of the x-ray tube. This position is also approximately 9-cm below a 20-mm aluminum filter that intercepts the x-ray beam and simulates the density of the human body.

The light emitted by the phosphor is picked up by a fiber optic probe located about 1 cm from the surface of the phosphor and fed through port in the side of the cabinet to the photomultiplier tube. The fiber optic is connected to the photomultiplier through an adapter that allows the use of various filters used in the measurement of color, brightness, and persistence.

In the measurement of persistence, a "standard" phosphor sample is placed on the stage. A 1 log neutral density filter is placed in the holder and, with the shutter open, the sample is excited for 10 sec. at 80 KVP (kilovolts peak). The resultant emission level is adjusted to nearly full scale chart deflection with the range switch on "Auto" and the indicator reading 0 scale by adjusting the phototype anode voltage. Next, the 1 log N.D. filter is replaced by a 0.0 log N.D. filter and subsequent samples are excited for 10 seconds with the phototube shutter closed. As soon as the x-ray tube kicks off, the phototube shutter is opened and with the recorder set at 5 inches/minute, a trace is made at the resultant decaying emission. The average persistence is recorded for one minute. The recorder trace is then measured to 10, 20, 30, etc., seconds after "cutoff" and the signal height measured at these points. The persistence is then recorded as the "Percent of Standard at Full Excitation at a Specified Time Increment, i.e., 30 Sec.".

While there has been shown and described what are at present considered the preferred embodiments of the invention, it will be obvious to those skilled in the art that various changes and modifications may be made therein without departing from the scope of the invention as defined by the appended claims.

What is claimed is:

1. An x-ray phosphor consisting essentially of a host selected from the group consisting of lanthanum oxysulfide, gadolinium oxysulfide, and yttrium oxysulfide, from about 0.001 to about 0.1 moles of terbium per mole of host as an activator and, from an effective amount to 25 parts per million of said host of cerium, as a decay accelerator.

2. An x-ray phosphor according to claim 1 wherein said cerium is present in amounts of from about 1 part to about 10 parts per million of said host.

3. An x-ray phosphor according to claim 2 wherein said terbium content is from about 0.001 to about 0.006 moles per mole of host.

4. An x-ray conversion screen comprising an x-ray transparent, light translucent substrate and in an adherent relationship to at least one side of said substrate, an x-ray phosphor consisting essentially of a host selected from the group consisting of lanthanum oxysulfide, gadolinium oxysulfide, and yttrium oxysulfide, from about 0.0005 to about 0.1 moles of terbium per mole of host as an activator and, from an effective amount to 25 parts per million of said host of cerium, as a decay accelerator.

5. An x-ray conversion screen according to claim 4 wherein said phosphor contains cerium in amounts of from about 1 part to about 10 parts per million of said host.

6. An x-ray conversion screen according to claim 5 wherein said phosphor composition contains terbium in amounts of from about 0.001 to about 0.006 moles per mole of host.

7. An x-ray screen according to claim 6 wherein an organic light transparent binder is used to adhere the phosphors to said substrate.

8. An x-ray screen according to claim 7 wherein a protective light and x-ray transparent film is on the side phosphor and binder opposing the substrate.

* * * * *